(12) United States Patent
Bar-Or et al.

(10) Patent No.: US 7,941,460 B2
(45) Date of Patent: May 10, 2011

(54) COMPILATION MODEL FOR PROCESSING HIERARCHICAL DATA IN STREAM SYSTEMS

(75) Inventors: Amir Bar-Or, Newton, MA (US);
Michael James Beckerle, Needham, MA (US)

(73) Assignee: International Business Machines Corporation, Armonk, NY (US)

( * ) Notice: Subject to any disclaimer, the term of this patent is extended or adjusted under 35 U.S.C. 154(b) by 503 days.

(21) Appl. No.: 11/850,589

(22) Filed: Sep. 5, 2007

(65) Prior Publication Data

US 2009/0063583 A1    Mar. 5, 2009

(51) Int. Cl.
*G06F 7/00* (2006.01)
(52) U.S. Cl. .......................... 707/803; 717/149; 707/802
(58) Field of Classification Search .............. 707/3, 802, 707/803; 717/149
See application file for complete search history.

(56) References Cited

U.S. PATENT DOCUMENTS

| | | | |
|---|---|---|---|
| 4,145,733 A | 3/1979 | Misunas et al. |
| 5,021,947 A | 6/1991 | Campbell et al. |
| 5,465,372 A | 11/1995 | Gottlieb et al. |
| 5,555,201 A | 9/1996 | Dangelo et al. |
| 5,603,018 A | 2/1997 | Terada et al. |
| 5,724,570 A | 3/1998 | Zeller et al. |
| 5,801,958 A | 9/1998 | Dangelo et al. |
| 5,806,062 A | 9/1998 | Chen et al. |
| 5,822,593 A | 10/1998 | Lamping et al. |
| 6,192,504 B1 | 2/2001 | Pflüger et al. |
| 6,311,265 B1 | 10/2001 | Beckerle et al. |
| 6,601,058 B2 | 7/2003 | Forster et al. |
| 6,654,952 B1 | 11/2003 | Nair et al. |
| 6,772,398 B2 | 8/2004 | Saluja et al. |
| 6,801,938 B1 | 10/2004 | Bookman et al. |
| 6,832,357 B2 | 12/2004 | Saluja et al. |
| 6,918,111 B1 | 7/2005 | Damron et al. |
| 6,954,749 B2 | 10/2005 | Greenblatt et al. |
| 7,080,088 B1 | 7/2006 | Lau |
| 7,254,590 B2 | 8/2007 | Mudunuri et al. |
| 7,299,458 B2 | 11/2007 | Hammes |
| 7,392,514 B2 | 6/2008 | Edwards |
| 7,467,371 B1 | 12/2008 | Meredith et al. |
| 2002/0080181 A1 | 6/2002 | Razdow et al. |
| 2003/0014379 A1 | 1/2003 | Saias et al. |

(Continued)

OTHER PUBLICATIONS

Florescu, D., C. Hillery, D. Kossmann, P. Lucas, F. Riccardi, T. Westmann, M.J. Carey, A. Sundarajan, and G. Agrawal, "The BEA/XQRL Streaming XQuery Processor", Proceedings of the 29th VLDB Conference, 2003, 12 pp.

(Continued)

*Primary Examiner* — Mahesh H Dwivedi
(74) *Attorney, Agent, or Firm* — Janaki K. Davda; Konrad Raynes & Victor LLP

(57) ABSTRACT

Provided are techniques for compilation of hierarchical data processing. A data flow diagram including one or more operators, wherein each operator includes at least one of an incoming arc and an outgoing arc, is received. For each operator, for each incoming arc, it is validated that an arc input formal schema is compatible with a schema rooted in a context node in an arc input actual schema, and, for each outgoing arc, an arc output formal schema is computed based on operator logic and operator inputs and an arc output actual schema is computed from the arc input actual schema by replacing the context node of the arc input actual schema with the arc output formal schema.

12 Claims, 14 Drawing Sheets

U.S. PATENT DOCUMENTS

| | | | |
|---|---|---|---|
| 2003/0191765 A1 | 10/2003 | Bargh et al. | |
| 2003/0200538 A1 | 10/2003 | Ebeling et al. | |
| 2004/0073545 A1* | 4/2004 | Greenblatt et al. | 707/3 |
| 2004/0117772 A1 | 6/2004 | Brand et al. | |
| 2004/0123072 A1 | 6/2004 | Kailas et al. | |
| 2004/0205058 A1 | 10/2004 | Kiji | |
| 2004/0207665 A1 | 10/2004 | Mathur et al. | |
| 2004/0225999 A1* | 11/2004 | Nuss | 717/114 |
| 2005/0071359 A1 | 3/2005 | Elandassery et al. | |
| 2005/0097561 A1* | 5/2005 | Schumacher et al. | 718/106 |
| 2005/0251527 A1 | 11/2005 | Phillips et al. | |
| 2005/0257194 A1* | 11/2005 | Morrow et al. | 717/109 |
| 2005/0257195 A1 | 11/2005 | Morrow et al. | |
| 2006/0005173 A1 | 1/2006 | Eng | |
| 2006/0048113 A1 | 3/2006 | Ozone et al. | |
| 2006/0277392 A1 | 12/2006 | Bittner, Jr. | |
| 2008/0052687 A1* | 2/2008 | Gonzales-Tuchmann et al. | 717/140 |
| 2008/0082984 A1 | 4/2008 | McDaniel | |
| 2008/0134158 A1* | 6/2008 | Salz et al. | 717/148 |
| 2009/0064157 A1 | 3/2009 | Bar-Or et al. | |

OTHER PUBLICATIONS

Koch, C., S. Sherzinger, N. Schweikardt, and B. Stegmaier, "FluXQuery: An Optimizing XQuery Processor for Streaming XML Data", Proceedings of the 30th VLDB Conference, 2004, pp. 1309-1312.

LDODDS.COM, "XML Pipeline", [online], updated on Aug. 21, 2002, [retrieved on Apr. 9, 2007], retrieved from the Internet at <URL: http://www.Idodds.com/wordtin/wiki.jsp?page=XMLPipeline>, 2 pp.

Morrison, J.P., "Flow-Based Programming: A New Approach to Application Development", Van Nostrand Reinhold, New York, 1994, Chapter 10, 13 pp.

Pal, S., I. Cseri, O. Seeliger, M. Rys, G. Schaller, W. Yu, D. Tomic, A. Baras, B. Berg, D. Churin, and E. Kogan, "XQuery Implementation in a Relational Database System", Proceedings of the 31st VLDB Conference, 2005, pp. 1175-1186.

U.S. Appl. No. 11/566,193, filed Dec. 1, 2006, entitled "System and Method for Implementing a Unified Model for Integration Systems", invented by A. Bar-Or and M.J. Beckerle.

US Patent Application, filed on Sep. 5, 2007, entitled "Optimization Model For Processing Hierarchical Data in Stream Systems", invented by A. Bar-Or and M.J. Beckerle.

Arvind and R.S. Nikhil, "Executing a Program on the MIT Tagged-Token Dataflow Architecture", © 1990 IEEE, pp. 300-318.

Bowers, S., B. Ludascher, A.H.H. Ngu, and T. Critchlow, "Enabling Scientific Workflow Reuse through Structured Composition of Dataflow and Control-Flow", Proceedings of the 22nd International Conference on Data Engineering Workshops, © 2006 IEEE, 10 pp.

Cardelli, L., and P. Wegner, "On Understanding Types, Data Abstraction, and Polymorphism", Computing Surveys, vol. 17, No. 4, Dec. 1985, pp. 471-522.

Kelly, P.M., P.D. Coddington, and A.L. Wendelborn, "Compilation of XSLT into Dataflow Graphs for Web Service Composition", Proceedings of the Sixth IEEE International Symposium on Cluster Computing and the Grid, © 2006 IEEE, 9 pp.

Leymann, F., and D. Roller, "Production Workflow: Concepts and Techniques", Sep. 1999, Prentice Hall PTR, 5 pp.

Morgenthal, J.P., "Enterprise Information Integration: A Pragmatic Approach", May 30, 2005, Lulu.com, 4 pp.

Morrison, J.P., "Data Responsive Modular Interleaved Task Programming System", IBM Technical Disclosure Bulletin, Jan. 1971, pp. 2425-2426.

Morrison, J.P., "Data Stream Linkage Mechanism", IBM System Journal, vol. 17, No. 4, 1978, pp. 383-408.

W3C, "XSL Transformations (XSLT) Version 2.0", [online], Jan. 23, 2007, [retrieved on Jun. 20, 2008], retrieved from the Internet at <URL: http://www.w3.org/TR/xslt20>, 50 pp.

Wikipedia, "Flow-based Programming", [online], modified Jun. 12, 2008, [retrieved on Jun. 26, 2008], retrieved from the Internet at <URL: http://en.wikipedia.org/wiki/Flow-based_programming>, 7 pp.

Wikipedia, "XML Pipeline", [online], modified Apr. 1, 2008, [retrieved on Apr. 19, 2008], retrieved from the Internet at <URL: http://en.wikipedia.org/wiki/XML_pipeline>, 4 pp.

U.S. Appl. No. 12/147,408, filed on Jun. 26, 2008, entitled "Pipeline Optimization Based on Polymorphic Schema Knowledge", invented by A. Bar-Or and M.J. Beckerle, 26 pp.

Yu. D. and H. Wang, "A New Approach for the Forward and Backward Substitutions of Parallel Solution of Sparse Linear Equations—Based on Dataflow Architecture", © 1990 IEEE, pp. 621-627.

Dennis, J.B. and David P.M., "A Preliminary Architecture for a Basic Data-Flow Processor", vol. 3, No. 4, Dec. 1974, pp. 126-132.

Miyazaki, T., and Edward A.L., "Code Generation by Using Integer-Controlled Dataflow Graph", Proceedings of the 1997 IEEE Internatinoal Conference ON Acoustics, Speech, and Signal Processing, vol. 1, 1997, 4 pp.

Neubauer, F., A. Hoheisel, and J. Geiler, "Workflow-based Grid Applications", © 2005 Elsevier, pp. 1-15.

Weimer, W. and G.C. Necula, "Finding and Preventing Run-Time Error Handling Mistakes", © 2004 ACM, vol. 39, No. 10, pp. 419-431.

* cited by examiner

COMPILATION MODEL FOR PROCESSING HIERARCHICAL DATA IN STREAM SYSTEMS

BACKGROUND

1. Field

Embodiments of the invention relate to a compilation model for processing hierarchical data in stream systems.

2. Description of the Related Art

A continuous process may be described as a process that reads from data sources and generates result data corresponding to input data as the input data becomes available. A system that runs as a continuous process is a "stream system". A stream system may be represented by a data flow diagram. The data sources may be continuous (i.e., data sources that provide data continually) or non-continuous (i.e., data sources that do not provide data continually).

Most data flow systems (also called flow-based programming systems (MORRISON, J. P., "Flow-Based Programming: A New Approach to Application Development", Van Nostrand Reinhold, New York, 1994)) use the relational model (also called relational data model) when processing information. The relational model defines a relation as a set of data items, and each data item is composed of a set of scalar named attributes. Relational query processors define relational operators. The query also regards the data flow as a directed graph of operators in which one operator consumes the output relations of other operators and produces new relations. The relational model has many advantages that commercial databases, among others exploit. The relational model is leveraged to optimize query processing by rewriting the graphs, introducing parallelism, eliminating unnecessary computations, etc.

However, the relational model is ill-equipped to deal with hierarchical data, where items in a relation can contain non-scalar attributes such as an attribute that contains a list of attributes or an attribute that by itself is a relation.

Several languages have been designed to address hierarchical data. XQuery is a language that was built on the foundation of Structured Query Language (SQL) to support the processing of eXtensible Markup Language (XML) hierarchical documents. There are many implementations that support the processing of XQuery, but only a few of them (KOCH, C., S. SHERZINGER, N. SCHWEIKARDT, and B. STEGMAIER, "FluXQuery: An Optimizing XQuery Processor for Streaming XML Data", Proceedings of the 30th VLDB Conference, 2004; FLORESCU, D., C. HILLERY, D. KOSSMANN, P. LUCAS, F. RICCARDI, T. WESTMANN, M. J. CAREY, A. SUNDARAJAN, and G. AGRAWAL, "The BEA/XQRL Streaming XQuery Processor", Proceedings of the 29th VLDB Conference, 2003; PAL, S., I. CSERI, O. SEELIGER, M. RYS, G. SCHALLER, W. YU, D. TOMIC, A. BARAS, B. BERG, D. CHURIN, and E. KOGAN, "XQuery Implementation in a Relational Database System", Proceedings of the 31st VLDB Conference, 2005) extend the relational model in order to leverage the optimization knowledge of the relational model. Extensible Stylesheet Language Transformation (XSLT) is a transformation language that is able to transform hierarchical XML documents. XSLT is not built on top of the relational model and does not benefit from its ability to support optimizations.

However, both XSLT and XQuery are lacking the definition of a component model that allows new user-supplied operators to be added to the process designs and an assembly model that allows the creation of complex data transformations. In data flow graphs, operators are the components, and flow-graphs are the "assembly". The component model may be described as the principles and software by which one can create new operators (new components) that are then assembled the same as any other operators (components). When applied to complex data transformations, languages like XSLT or XQuery tend to become very complex to understand and hence become error-prone.

Thus, there is a need in the art for an improved compilation model for processing hierarchical data in stream systems.

SUMMARY OF EMBODIMENTS OF THE INVENTION

Provided are a method, computer program product, and system for compilation of hierarchical data processing. Embodiments use a data flow diagram including one or more operators, wherein each operator includes at least one of an incoming arc and an outgoing arc, is received. For each operator, for each incoming arc, it is validated that an arc input formal schema is compatible with a schema rooted in a context node in an arc input actual schema, and, for each outgoing arc, an arc output formal schema is computed based on operator logic and operator inputs and an arc output actual schema is computed from the arc input actual schema by replacing the context node of the arc input actual schema with the arc output formal schema.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments of the invention. It is understood that other embodiments may be utilized and structural and operational changes may be made without departing from the scope of the invention.

Figure 1:
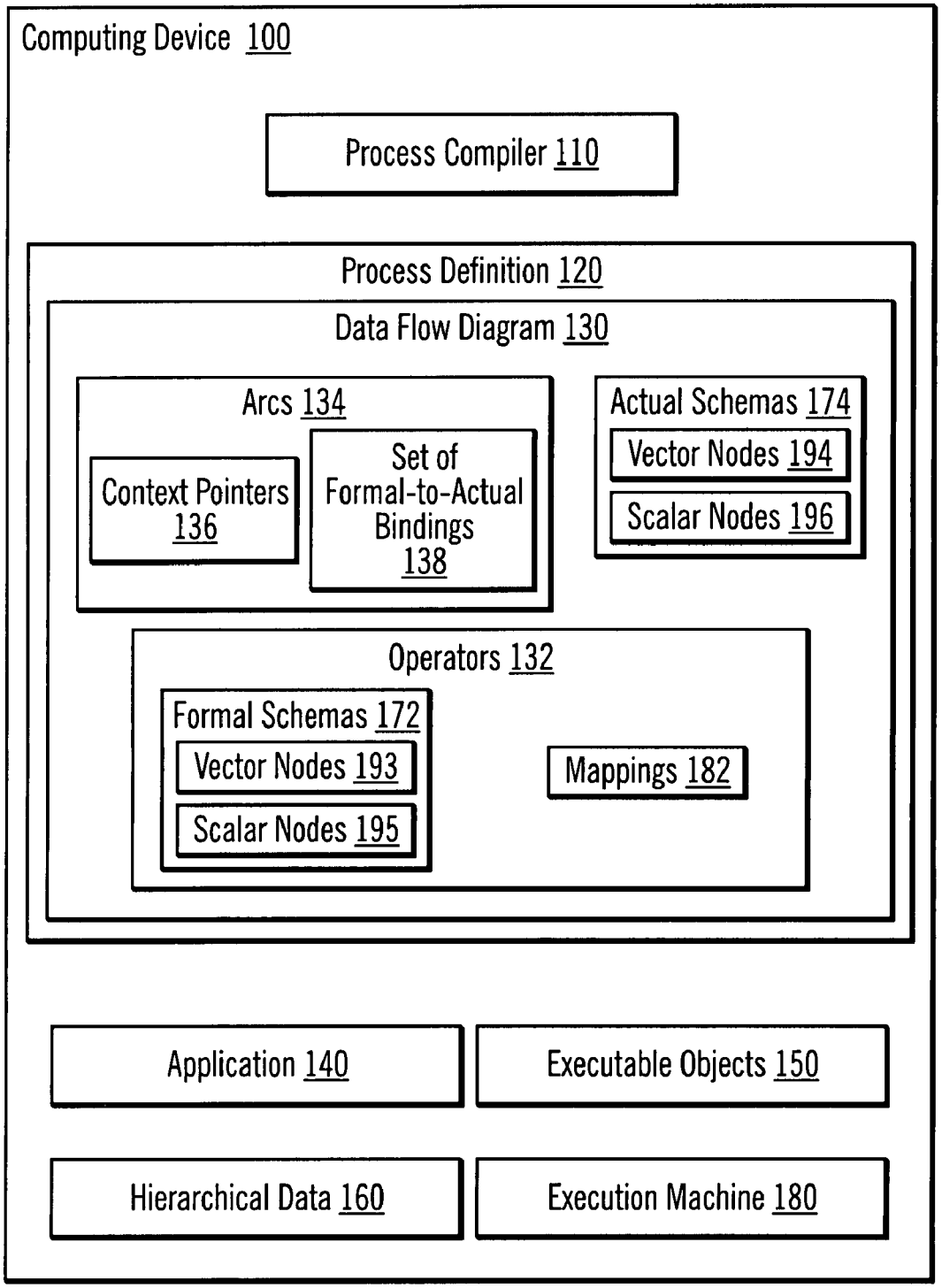
FIG. 1 illustrates details of a computing device in accordance with certain embodiments.

FIG. 1 illustrates details of a computing device 100 in accordance with certain embodiments. The computing device 100 includes a process compiler 110, a process definition 120, an application 140, executable objects 150, hierarchical data 160, and an execution machine 180.

The process definition 120 includes a data flow diagram 130, which includes operators 132, arcs 134, and actual schemas 174. The actual schemas 134 may be part of the data flow diagram 130 or created when the process compiler 110 runs. Each operator 132 definition includes a formal schema 172 and mappings 182. Each arc 134 may include a context pointer 136 and a set of formal-to-actual bindings 138. The set of formal-to-actual bindings 138 are used when names do not match between formal and actual schemas 172, 174. Each schema 172, 174 may be described as a logical description of a data type and includes a description of the hierarchical nature of the data (i.e., defines the structure of the data). Each schema 172, 174 is capable of including vector nodes 193, 194 and scalar nodes 195, 196. A formal schema 172 is defined by an operator 132 and represents the type of data that operator 132 can accept on an input arc or produce on an output arc. An actual schema 174 is defined by the data flow diagram 130 assembly and represents the type of data being supplied to the operator 132 through an arc 134. Each arc 134 has schemas that are descriptions of the structure of data, particularly, hierarchical schemas describe hierarchical data.

References to "data" herein are references to hierarchical data. Hierarchical data 160 may be described as including nested structures, which in turn may include nested repeating vector nodes 193, 194. A vector node 193, 194 may represent a vector of a complex structure that can, in turn, contain multiple scalars (represented by scalar nodes 195, 196) and vectors (represented by vector nodes 193, 194). In certain embodiments, hierarchical data 160 may be represented as a hierarchical tree data structure having sub-trees. In certain embodiments, each schema 170 has a tree structure. A node in the tree structure may represent a vector or a scalar. Each child node of a node has a unique name among the other siblings.

The executable objects 150 represent some form of output that is suitable for execution (e.g., executable code). The process compiler 110 receives a process definition 120 as input and outputs executable objects 150. The execution machine 180 executes the executable objects 150.

Embodiments provide the process compiler 110 for compiling the process definition 120 that relies on a hierarchical data model and a component model. Embodiments allow the application 140 to be built up from operators 132 that perform relational-like operations on parts of the hierarchical data 160 in a synergistic way that does not exclude many common relational optimizations, such as data partitioning, operator re-ordering, parallelization, etc. Embodiments do not require the user to create a data flow diagram that shreds (i.e., takes apart into constituent non-hierarchical pieces) or reassembles the hierarchical data 160 in order to perform operations that involve only an inner part of the hierarchical structure of the hierarchical data 160. This greatly increases the re-usability of the operators 132 and reduces the number of operators 132 in a process design.

The compiler 100 accepts a process definition 120 as user input and compiles the process definition 120 into executable form (e.g., as executable objects). In certain embodiments, a process definition 120 may be described as a data flow diagram 130. A process definition 120 may be constructed from the following components: a data flow diagram 130, operators 132, and arcs 134. A data flow diagram 130 may be described as a directed graph where the vertices/boxes of the graph are called operators 132 and the arcs 134 describe directional flow of data. The data flow diagram 130 describes the data as it flows from various data sources through different operators to various data targets. Operators 132 are able to read data from an external resource, write data to an external resource, and/or apply data transformations while doing so. In general, operators 132 are able to consume data from every incoming arc and can produce data on every outgoing arc. Operators 132 define formal schemas 172 for each input and output arc. A formal schema 172 may be described as a definition of requirements that the actual schema should meet. Arcs 134 represent flow of data between two connected operators 132. Data that flows on the arc 134 is associated with an actual schema 174 that defines the structure of the data.

Figure 2:
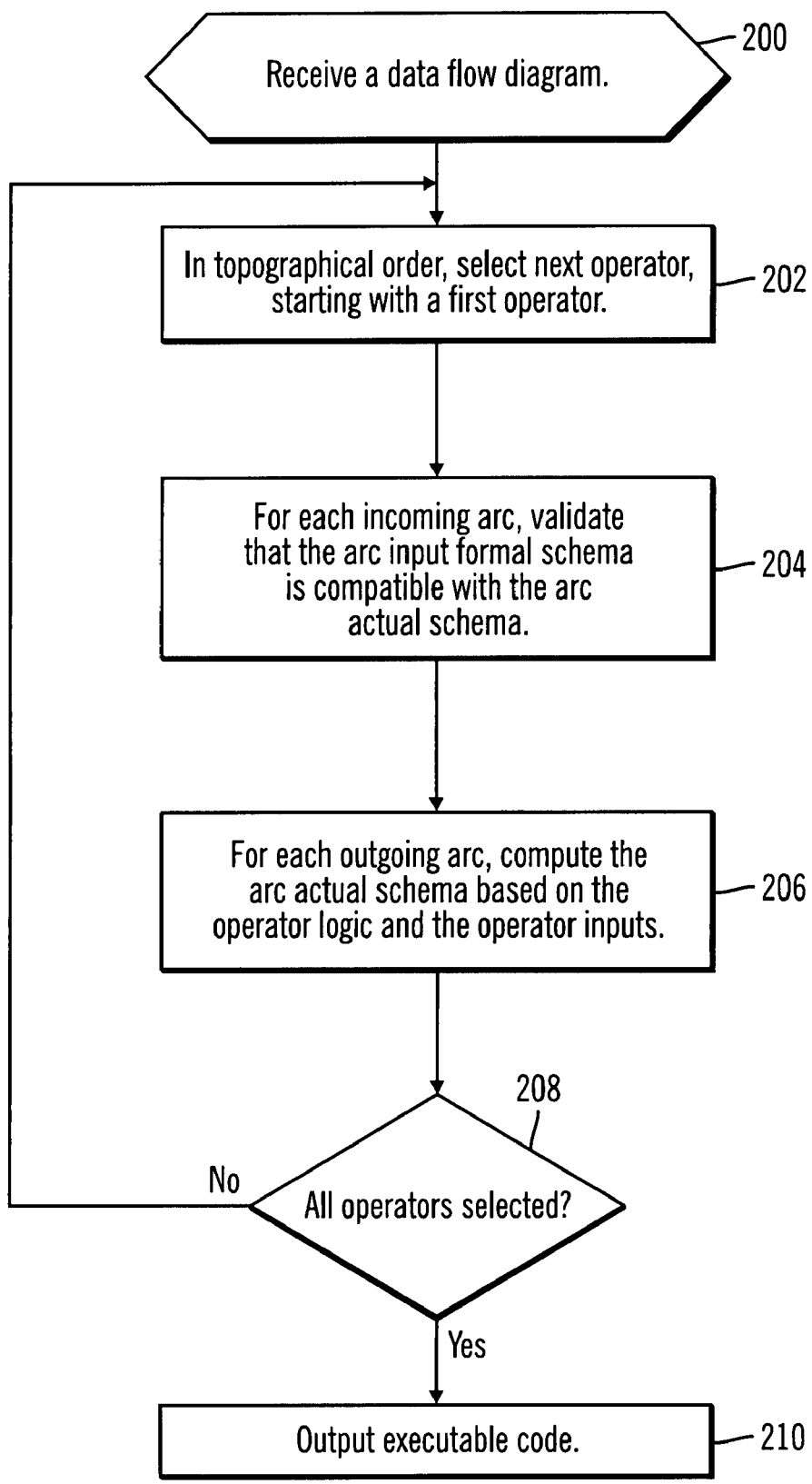
FIG. 2 illustrates logic performed by a compiler in accordance with certain embodiments.

FIG. 2 illustrates logic performed by the process compiler 110 in accordance with certain embodiments. Control begins at block 200 with the process compiler 110 receiving a process definition 120 in the form of a data flow diagram 130. In block 202, the process compiler 110 selects a next operator 132 in the data flow diagram 130, starting with a first operator 132, in topographical order consistent with data flow order (e.g., some order consistent with the directions of the arcs). In block 204, for each incoming arc 134 of the operator 132, the process compiler 110 validates that the arc input formal schema 172 is compatible with the arc actual schema 174. For example, the formal schema 172 may describe "ID number", and the actual schema 174 may describe "department ID" or "employee ID". In this example, an actual schema 174 describing "department ID" is compatible with a formal schema describing "ID number" however, since the names of the nodes don't match, the arc can contain a set of formal-to-actual bindings 138 which specify exactly which actual input node is to match a formal node. In block 206, for each outgoing arc 134 of the operator 132, the process compiler 110 computes the arc actual schema 174 based on the operator logic and the operator inputs. In block 208, the process compiler 110 determines whether all operators 132 have been processed. If so, processing continues to block 210, otherwise, processing loops back to block 202 to select another operator 132. In block 210, the process compiler 110 outputs executable objects 150. Execution carries out the transformations on the actual data that are described by the actual schemas and the operators with their formal and actual schemas.

The actual schema describes hierarchical data 160 represented as a hierarchical data structure, and embodiments extend the logic of FIG. 2 with the following hierarchical abilities:

1. An operator 132 can operate on any part of the actual schema 174 without the extraction/promotion of the required part as a separate hierarchical or non-hierarchical data item.

2. The output of an operator 132 is recombined with the untouched parts of the input without additional expression by the user and with low or no execution cost.

3. An operator 132 is not aware and does not operate on any data that is not described by the arc input formal schema 172 even if the data is described in the incoming arc actual schema 174. This property allows the operator to be highly reusable in that different instances of the operator 132 can manipulate parts within the hierarchy of data in the application.

The hierarchical abilities are achieved with context nodes and context preservation. With reference to a context node, in the process definition 120, each arc 134 contains a context pointer 136 defined by a user as part of the process definition. The context pointer 136 points to a context node in an actual schema tree of the arc 134. That is, the context pointer 136 points to data that the operator 132 is to consume. By default, the context pointer 136 points to the root of the actual schema tree. With reference to context preservation, for each outgoing arc 134, an operator 132 sets a single incoming arc 134 as the arc context source so that it is unambiguous which input arc's context is being preserved to each output.

Figure 3:
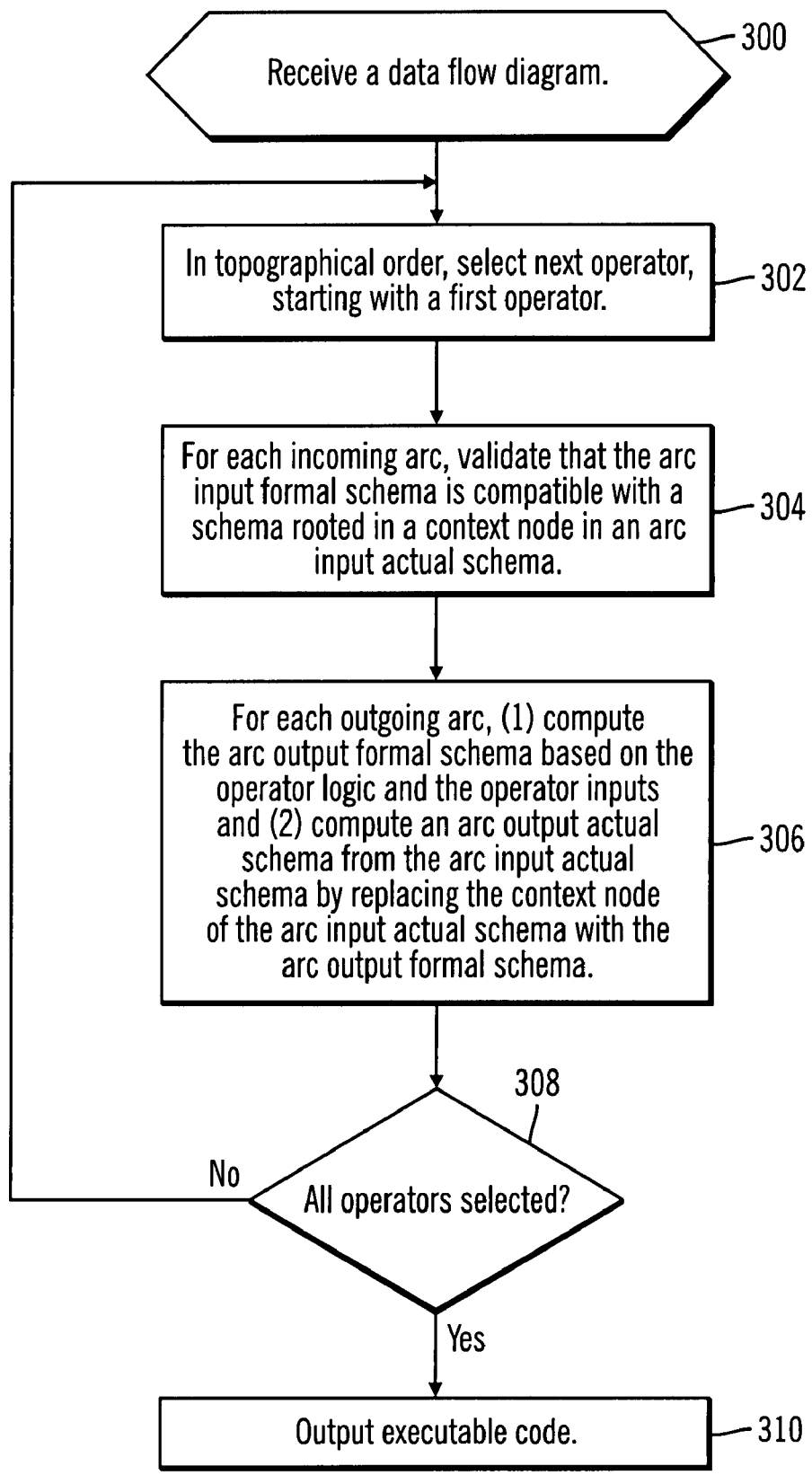
FIG. 3 illustrates logic performed by a compiler to achieve hierarchical abilities in accordance with certain embodiments.

FIG. 3 illustrates logic performed by the process compiler 110 to achieve the hierarchical abilities in accordance with certain embodiments. Control begins at block 300 with the process compiler 110 receiving a process definition 120 in the form of a data flow diagram 130. In block 302, the process compiler 110 selects a next operator 132 in the data flow diagram 130, starting with a first operator 132, in topographical order consistent with data flow order (e.g., some order consistent with the directions of the arcs). In block 304, for each incoming arc 134 of the operator 132, the process compiler 110 validates that the arc input formal schema 172 is compatible with the schema rooted in the context node in an arc input actual schema (that is, the portion of the actual schema that the context pointer 136 points to which includes the context node and all nodes beneath it in the hierarchical data, which are called child nodes). In certain embodiments, the validation either matches names of the arc input formal schema 172 and the schema rooted in the context node in the arc input actual schema 174. In certain embodiments in which names do not match, the validation uses a set of formal-to-actual bindings 138 that can be on the arc as part of the process design to match the arc input formal schema 172 and the schema rooted in the context node in the arc input actual schema 174. In block 306, for each outgoing arc 134 of the operator 132, the process compiler 110 (1) computes an arc output formal schema 172 based on the operator logic and the operator inputs (e.g., data pointed to by a context pointer 136 in an actual schema of an incoming arc) and (2) computes an arc output actual schema 174 from the arc input actual schema by replacing the context node of the arc input actual schema with the arc output formal schema 172. In block 308, the process compiler 110 determines whether all operators 132 have been processed. If so, processing continues to block 310, otherwise, processing loops back to block 302 to select another operator 132. In block 310, the process compiler 110 outputs executable objects 150.

In certain embodiments, a schema is a tree structure made up of nodes. Each node has a name, type, and dimensionality (vector or scalar). The type can be a number, character string, date, time, or can be a group containing multiple other "nodes" that can themselves contain multiple other nodes, and so on.

Figure 4:
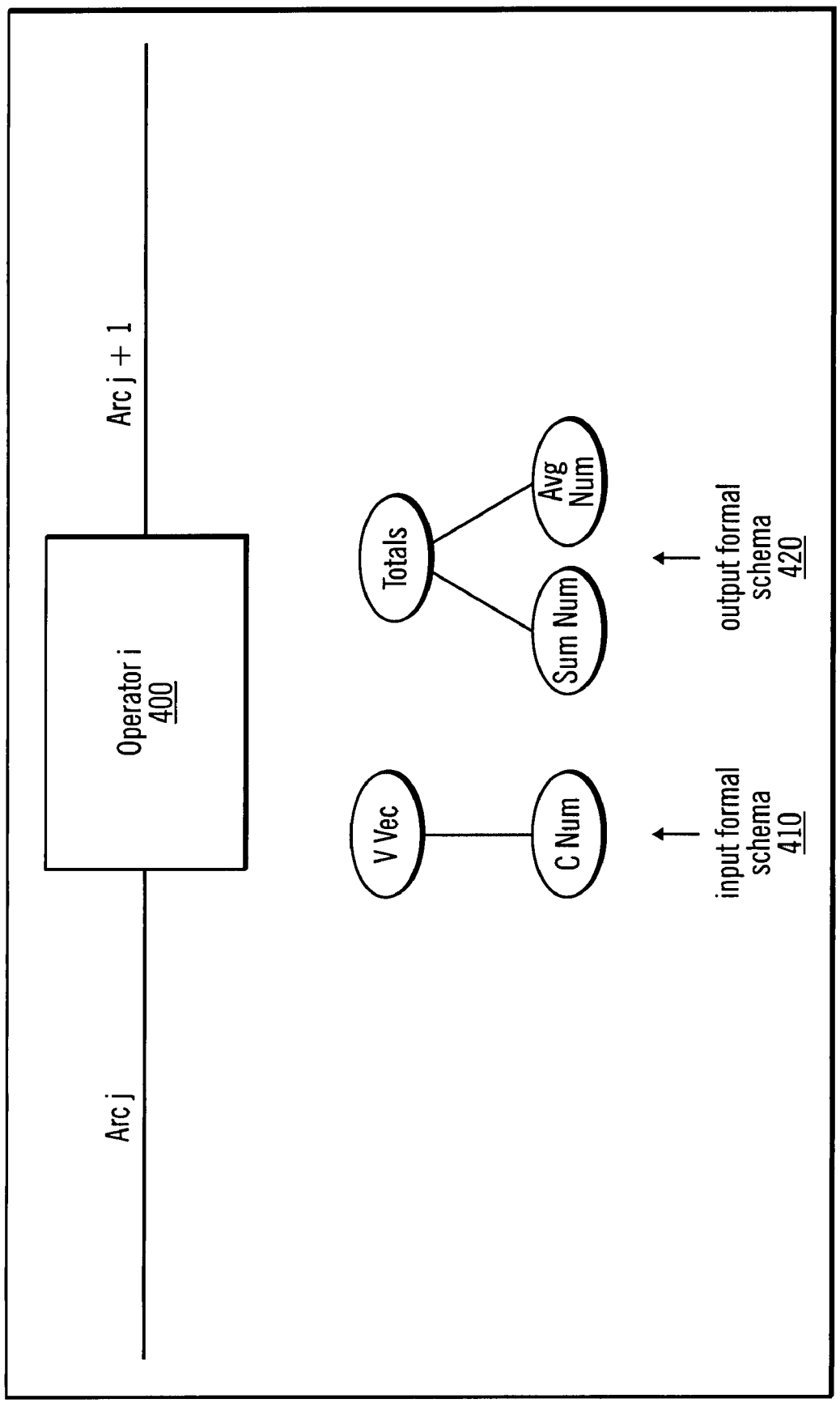
FIGS. 4-8 illustrate an example of compiling a process in accordance with certain embodiments.

FIGS. 4-8 illustrate an example of compiling a process in accordance with certain embodiments. FIG. 4 illustrates an operator 400 in a graph with an arc input formal schema 410 and an arc output formal schema 420. In FIG. 4, the rest of the operators of the graph are omitted for simplicity. The operator 400 is expecting a vector ("V Vec" node in the arc input formal schema 410) that consists of one attribute "c" that can be any number type ("C Num" node in the arc input formal schema 410). The operator 400 produces a totals node ("Totals" node in the arc output formal schema 420) that contains a sum attribute ("Sum Num" node in the arc output formal schema 420) and an average attribute ("Avg Num" node in the arc output formal schema 420).

Figure 5:
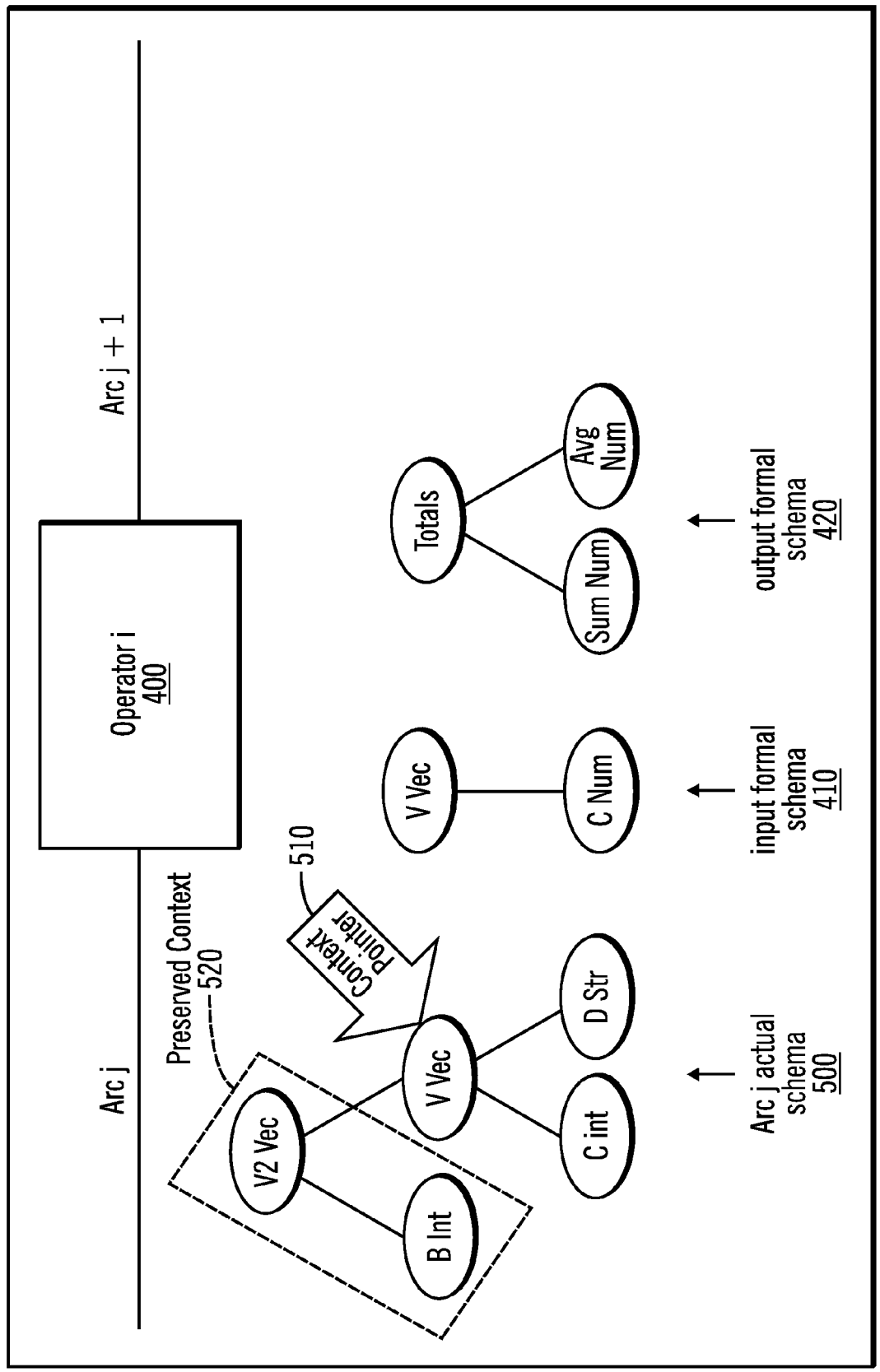

FIG. 5 illustrates an actual schema 500 computed from an upstream operator and a context pointer 510 that is established by the user as part of the design of the process definition 120. When the process compiler 110 successfully compiles the upstream operator, i.e., an operator that precedes operator 400, the process compiler 110 computes the actual schema 500 for arc j. When using an operator to create a process, the user sets the context pointer 510 of Arc j, which designates the part of the data that is to be operated on by operator 400. Also, the V2Vec and "B int" nodes represent preserved context 520.

Figure 6:
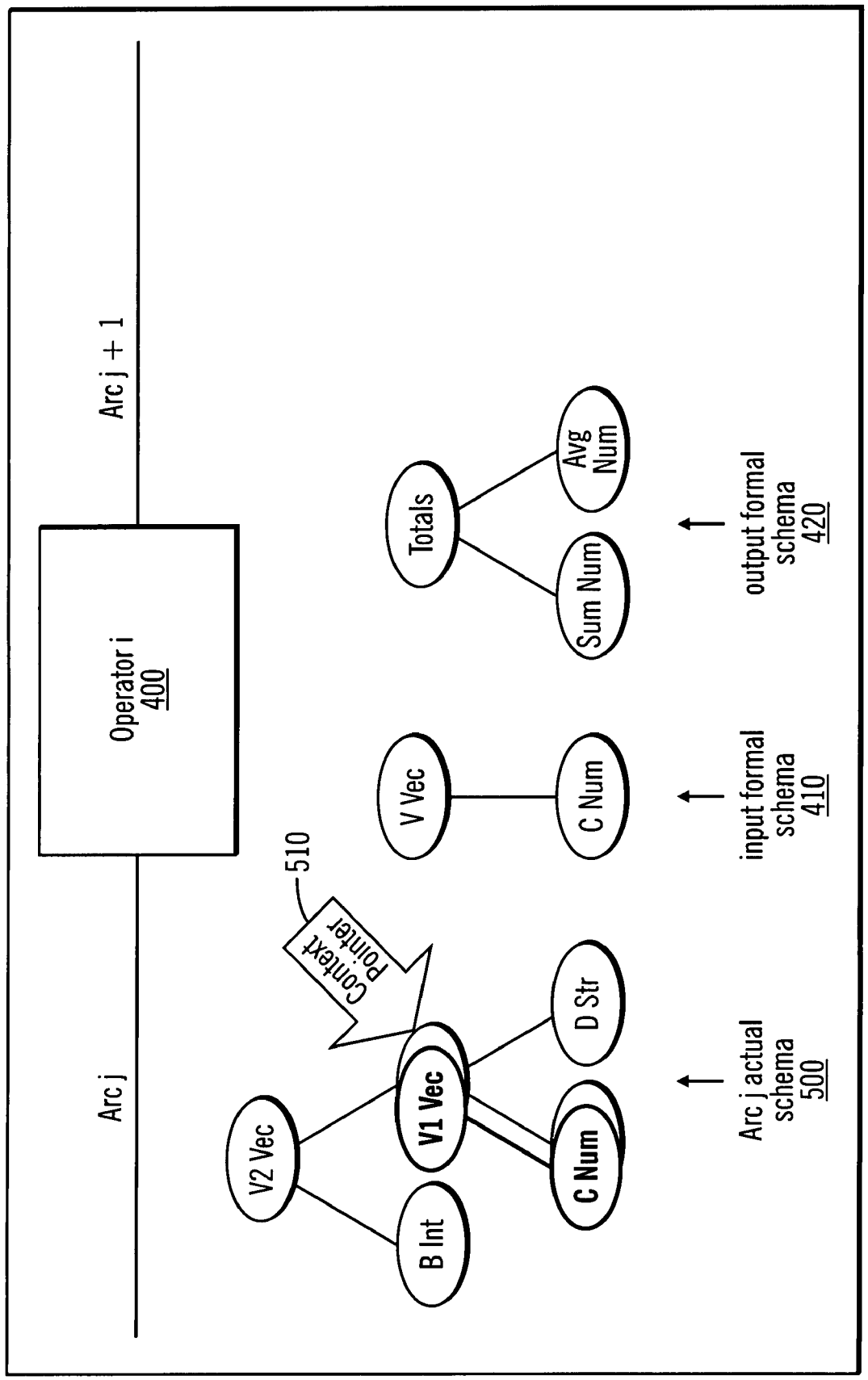

FIG. 6 illustrates checking for compatibility between the actual schema 500 under the context pointer 510 and the arc input formal schema 410 (which is the processing of block 304 of FIG. 3). In this example, the actual schema 500 and the arc input formal schema 410 are compatible in that the arc input formal schema 410 is a generalization of the actual schema 500 identified by the context pointer 510. In particular, the "V Vec" and "C Num" nodes of the arc input formal schema 410 are compatible with the "V Vec" and "C int" nodes in the actual schema 500 for arc j. Whether the "D Str" node of the actual schema 500 makes it to the output actual schema 800 (FIG. 8) depends on the operation of the operator 400.

Figure 7:
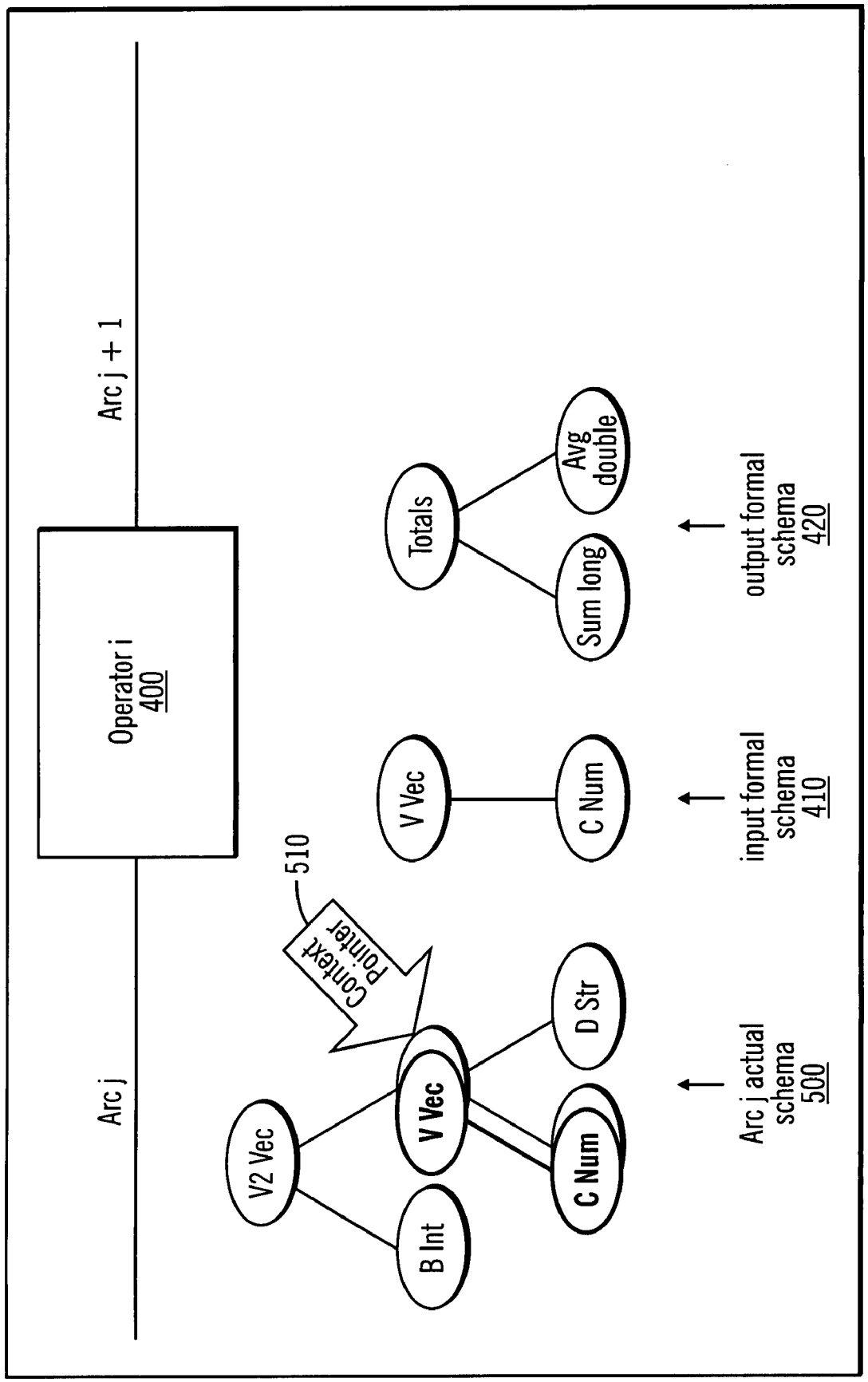

FIG. 7 illustrates computing an arc output formal schema 420 (which is a portion of the processing of block 306 of FIG. 3). In particular, the arc output formal schema 420 is modified so that the "Totals", "Sum Num", and "Avg Num" nodes of the arc output formal schema 420 become "Totals", "Sum long", and "Avg double" nodes.

Figure 8:
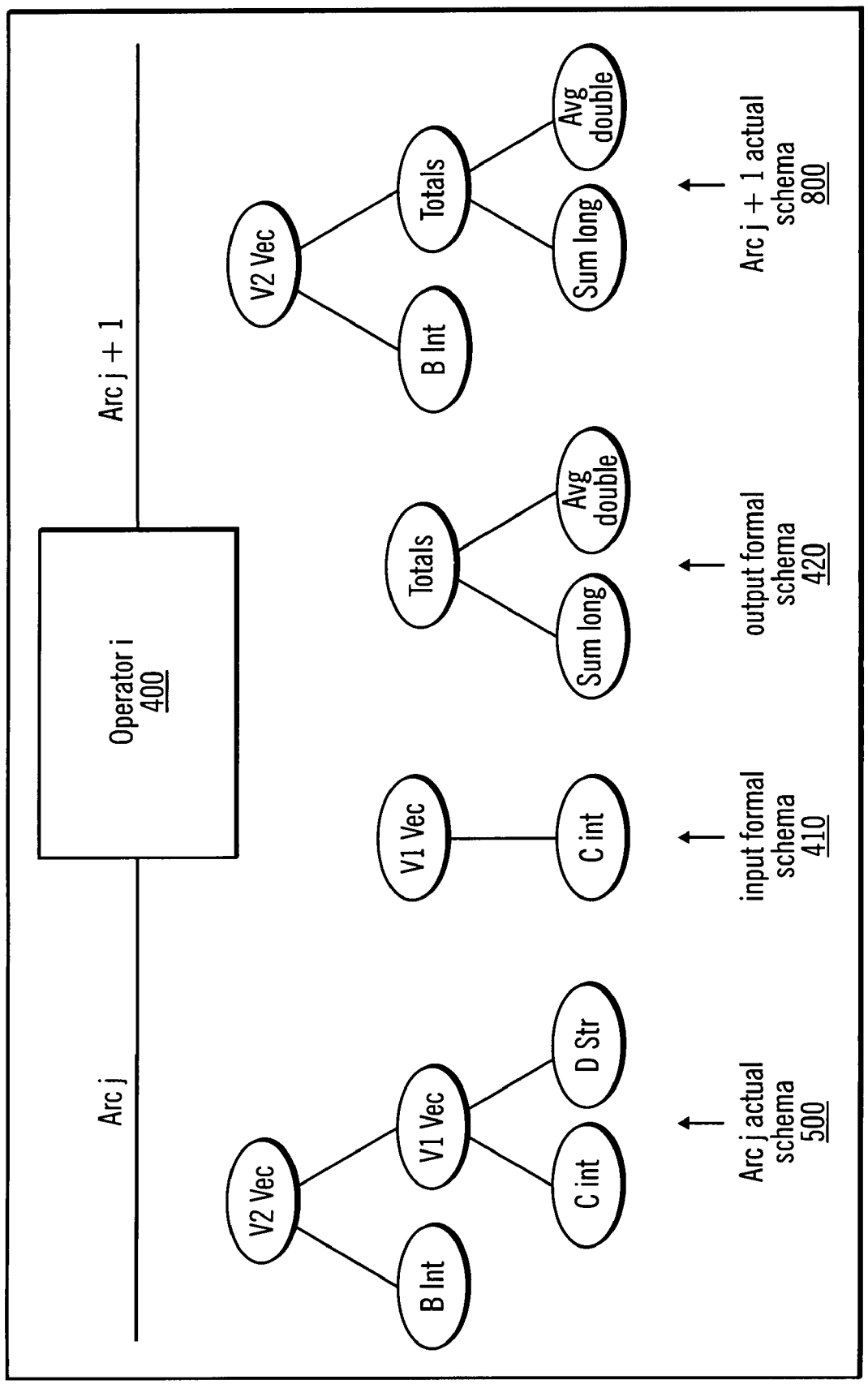

FIG. 8 illustrates computation of the actual schema 800 for arc j+1 (which is a portion of the processing of block 306 of FIG. 3). In particular, the "V vec" node and "C Num" node of the arc input formal schema 410 are replaced by the "V1 vec" node and the "C int" node of the actual schema 800 to give the operator access to those parts of the data described by the corresponding parts of the actual input schema. Also, the actual schema 800 is generated by replacing the "V1 Vec", "C int", and "DStr" node group of the actual schema 500 for arc j with the arc output formal schema, which has "Totals", "Sum long", and "Avg double" nodes of the arc output formal schema 420.

Notice that the operator 400 was not aware of the existence of the "V2" and "B" nodes and did not change their value, but these nodes are still available for the downstream (following) operator. Also, in a different process definition, the same operator (same code and same logic of FIG. 3) may be used to operate on "V2" and "B" instead of "V1" and "C", thus creating sums of "B" rather than "C". This shows the reusability of the operator 132 for different points of the hierarchy. Thus, the arc j+1 actual schema 800 was computed for the preceding operator 400.

An operator 132 may or may not have a polymorphic mapping 182 of a node to the output as part of the function that the operator 132 computes. If the operator 132 does have such a mapping 182, then all members of a node are preserved.

Figure 9:
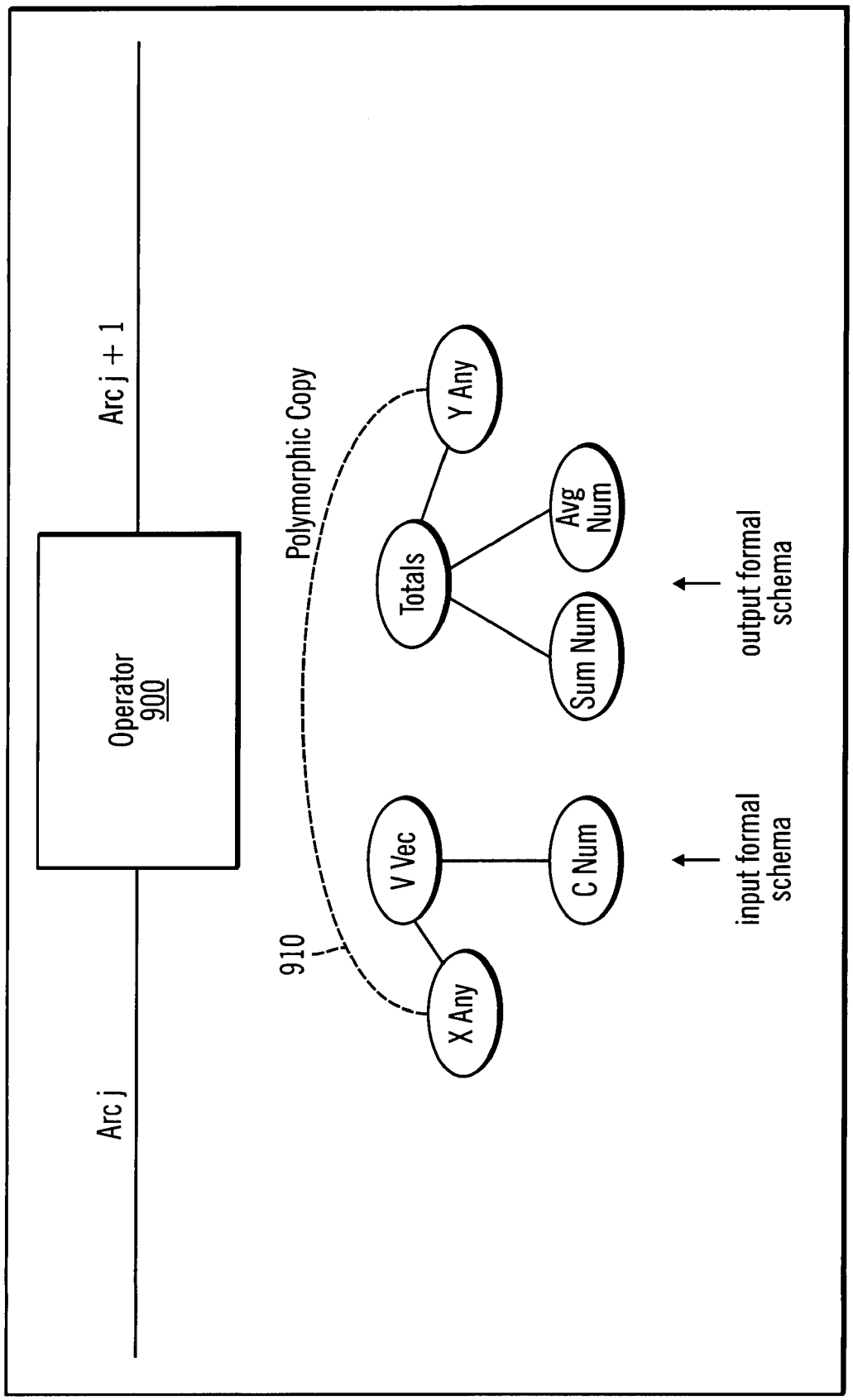
FIGS. 9-13 illustrate an example of polymorphic copy in accordance with certain embodiments.
Figure 10:
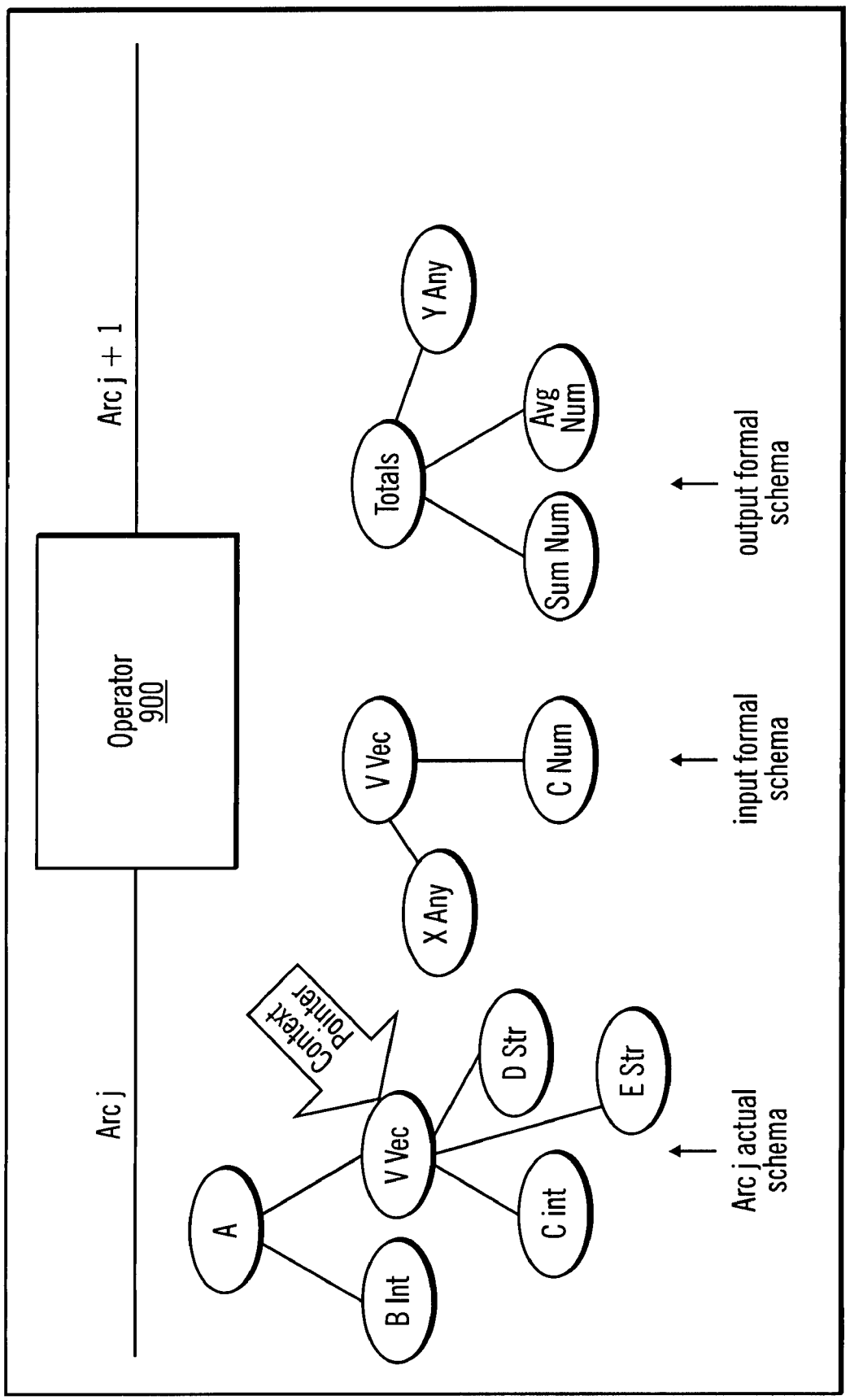
Figure 11:
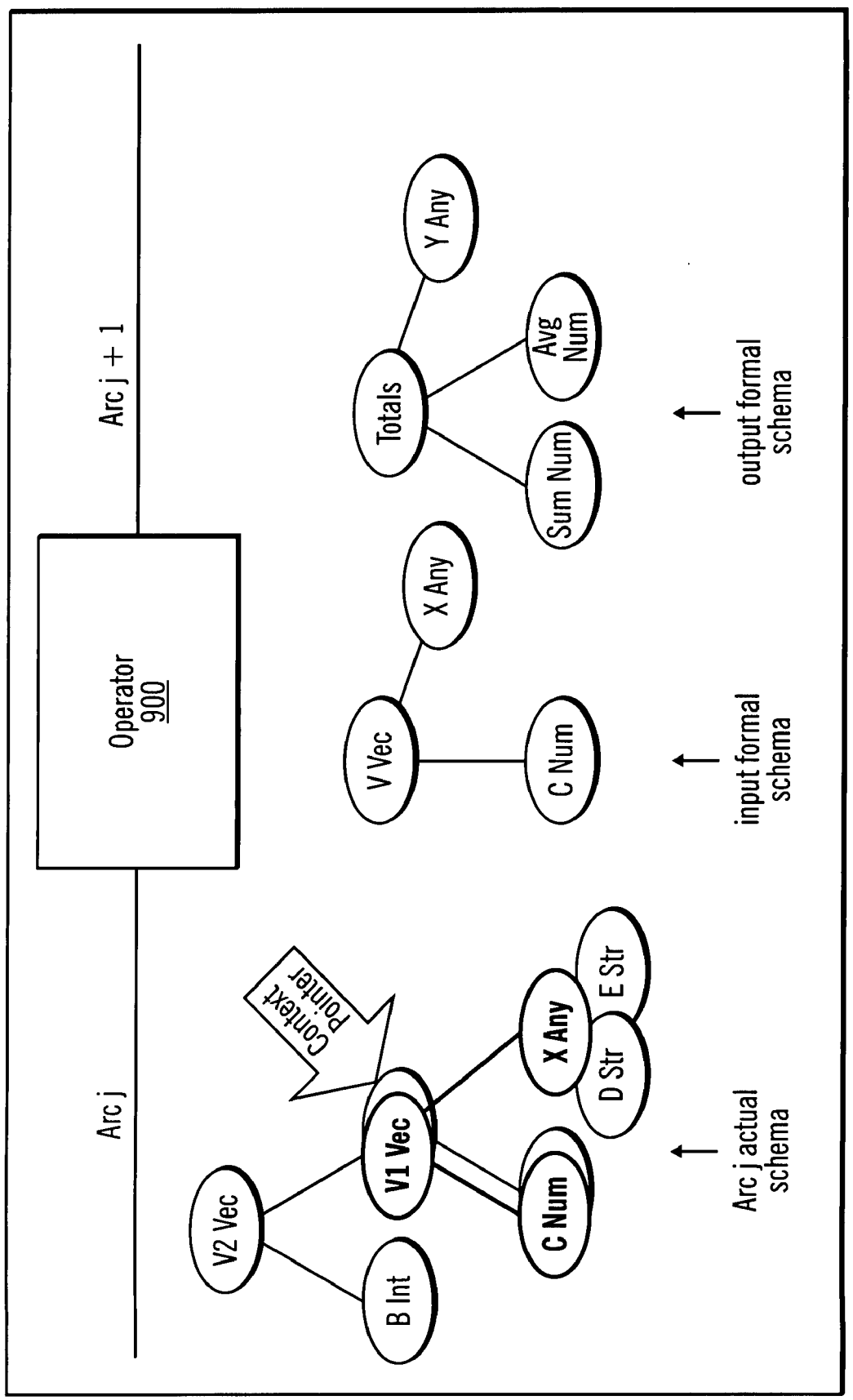
Figure 12:
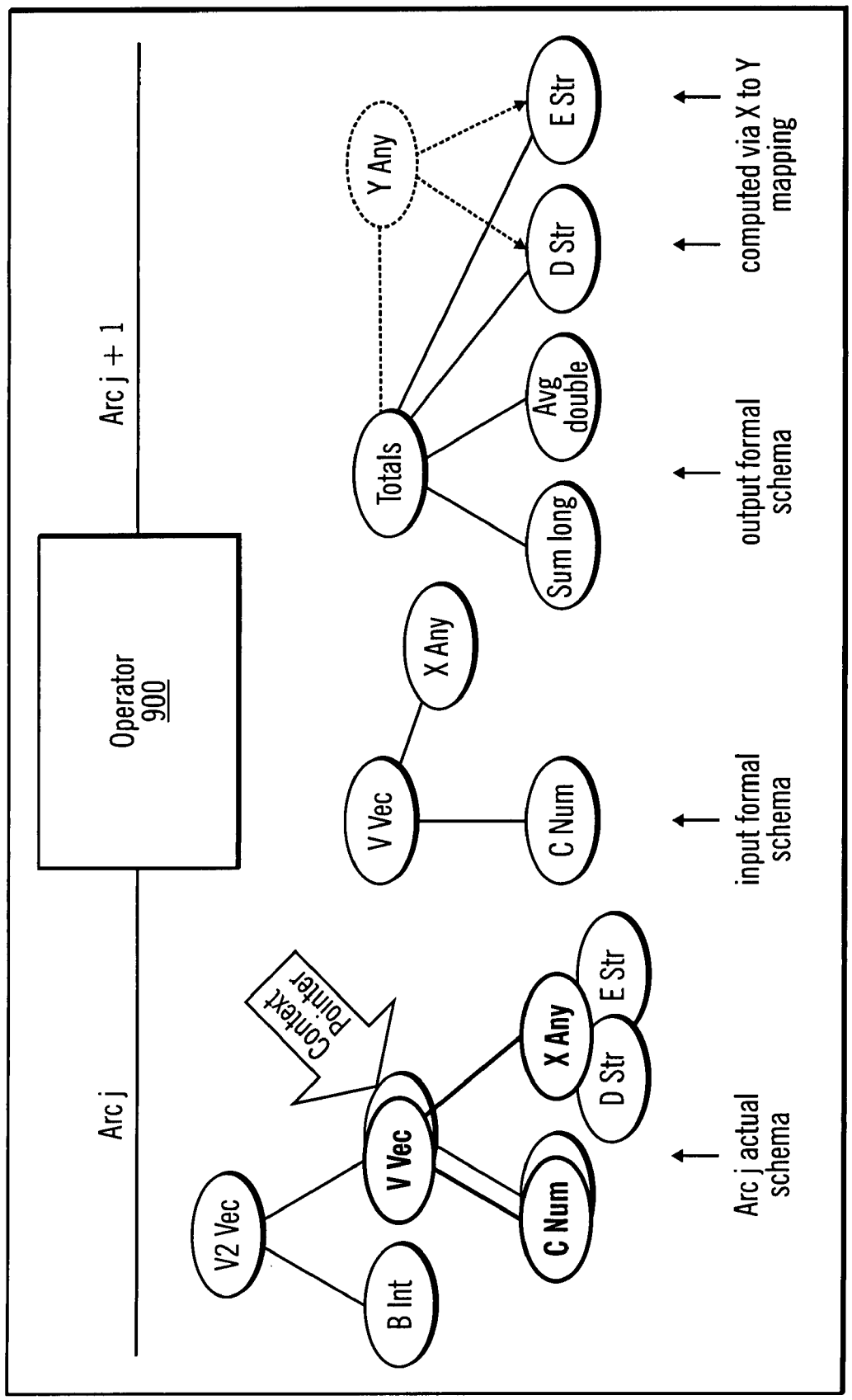
Figure 13:
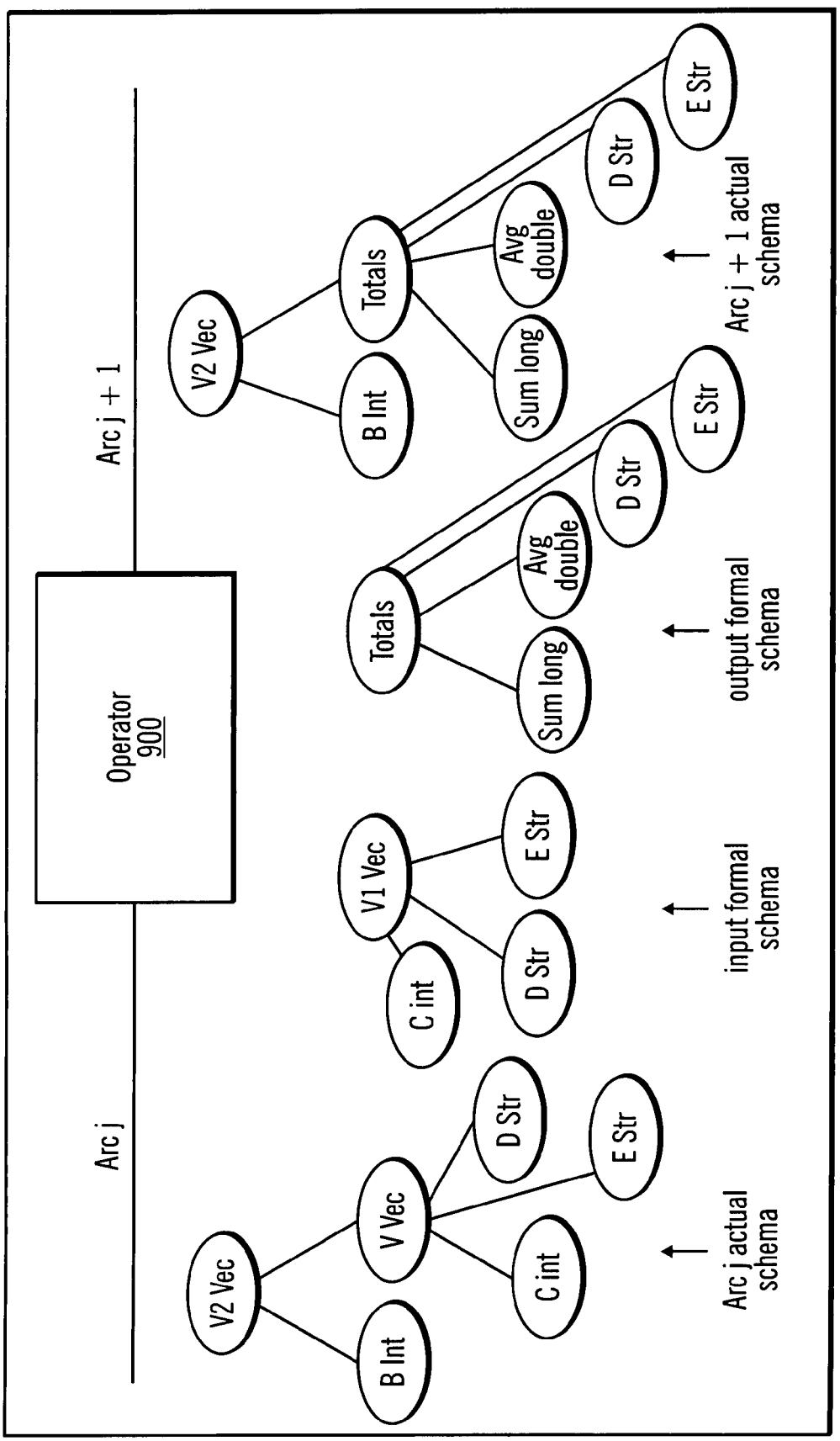

FIGS. 9-13 illustrate an example of polymorphic copy for operator 900 in accordance with certain embodiments. In FIG. 9, polymorphic copy is expressed via the X to Y mappings 910 part of the operator 900 definition. The X to Y mappings 910 are represented by the "X Any" and "Y Any" nodes. In FIG. 10, the arc j actual schema is shown, in which the "V Vec" node has members "C int", "D Str", and "E Str". In FIG. 11, the "X Any" node becomes the representative of both the "D Str" and "E Str" nodes descending from the "V1 Vec" node. In FIG. 12, under the "Totals" node, the "D Str" and "E Str" nodes are computed via the X to Y mapping. In FIG. 13, the "D Str" and "E Str" nodes replace the "X any" node and are included in the arc j+1 actual schema.

So to clarify, there really are two ways that nodes are preserved. One is by being outside the context where the operator 132 works entirely (i.e., the operator 132 does not see the nodes at all (e.g., "B int" and "V2 Vec" in FIG. 13)). The other is by being explicitly mapped to the output of the operator with a polymorphic copy operation (e.g., "D Str" and "E Str" in FIG. 13).

Thus, embodiments enable compiling transformations on nodes of hierarchical data structures "in place" while they reside inside a preserved part of the larger hierarchical data structure and enable operators 132 that may not know how to deal with a large and complex hierarchical data structure to operate on a node within the hierarchy without dismantling the hierarchy.

Embodiments combine data flow semantics and hierarchical schemas while facilitating reusable relational operators as software components since relational data is a subset of hierarchical data 160. Embodiments include Extract Transform Load (ETL) systems for processing hierarchical data structures, query processing, and/or message processing.

Additional Embodiment Details

The described operations may be implemented as a method, computer program product or apparatus using standard programming and/or engineering techniques to produce software, firmware, hardware, or any combination thereof.

Each of the embodiments may take the form of an entirely hardware embodiment, an entirely software embodiment or an embodiment containing both hardware and software elements. The embodiments may be implemented in software, which includes but is not limited to firmware, resident software, microcode, etc.

Furthermore, the embodiments may take the form of a computer program product accessible from a computer-usable or computer-readable medium providing program code for use by or in connection with a computer or any instruction execution system. For the purposes of this description, a computer-usable or computer readable medium may be any apparatus that may contain, store, communicate, propagate, or transport the program for use by or in connection with the instruction execution system, apparatus, or device.

The described operations may be implemented as code maintained in a computer-usable or computer readable medium, where a processor may read and execute the code from the computer readable medium. The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a rigid magnetic disk, an optical disk, magnetic storage medium (e.g., hard disk drives, floppy disks, tape, etc.), volatile and non-volatile memory devices (e.g., a random access memory (RAM), DRAMs, SRAMs, a read-only memory (ROM), PROMs, EEPROMs, Flash Memory, firmware, programmable logic, etc.). Current examples of optical disks include compact disk-read only memory (CD-ROM), compact disk-read/write (CD-R/W) and DVD.

The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices.

A computer program product may comprise computer useable or computer readable media, hardware logic, and/or transmission signals in which code may be implemented. Of course, those skilled in the art will recognize that many modifications may be made to this configuration without departing from the scope of the embodiments, and that the computer program product may comprise any suitable information bearing medium known in the art.

The term logic may include, by way of example, software, hardware, firmware, and/or combinations of software and hardware.

Certain implementations may be directed to a method for deploying computing infrastructure by a person or automated processing integrating computer-readable code into a computing system, wherein the code in combination with the computing system is enabled to perform the operations of the described implementations.

The logic of FIGS. 2 and 3 describes specific operations occurring in a particular order. In alternative embodiments, certain of the logic operations may be performed in a different order, modified or removed. Moreover, operations may be added to the above described logic and still conform to the described embodiments. Further, operations described herein may occur sequentially or certain operations may be processed in parallel, or operations described as performed by a single process may be performed by distributed processes.

The illustrated logic of FIGS. 2 and 3 may be implemented in software, hardware, programmable and non-programmable gate array logic or in some combination of hardware, software, or gate array logic.

Figure 14:
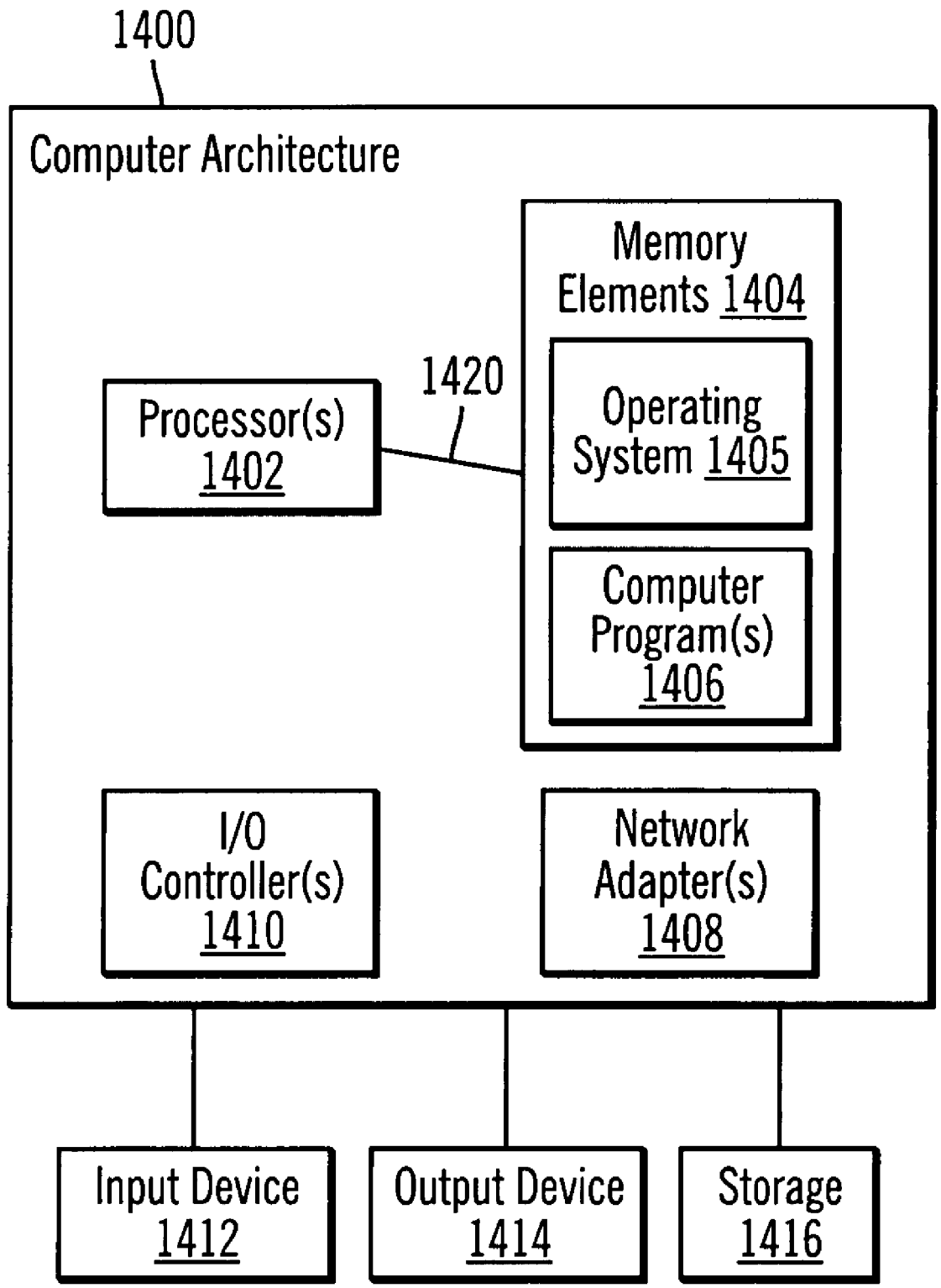
FIG. 14 illustrates a system architecture that may be used in accordance with certain embodiments.

FIG. 14 illustrates a system architecture 1400 that may be used in accordance with certain embodiments. Computing device 100 may implement system architecture 1400. The system architecture 1400 is suitable for storing and/or executing program code and includes at least one processor 1402 coupled directly or indirectly to memory elements 1404 through a system bus 1420. The memory elements 1404 may include local memory employed during actual execution of the program code, bulk storage, and cache memories which provide temporary storage of at least some program code in order to reduce the number of times code must be retrieved from bulk storage during execution. The memory elements 1404 include an operating system 1405 and one or more computer programs 1406.

Input/Output (I/O) devices 1412, 1414 (including but not limited to keyboards, displays, pointing devices, etc.) may be coupled to the system either directly or through intervening I/O controllers 1410.

Network adapters 1408 may also be coupled to the system to enable the data processing system to become coupled to other data processing systems or remote printers or storage devices through intervening private or public networks. Modems, cable modem and Ethernet cards are just a few of the currently available types of network adapters 1408.

The system architecture 1400 may be coupled to storage 1416 (e.g., a non-volatile storage area, such as magnetic disk drives, optical disk drives, a tape drive, etc.). The storage 1416 may comprise an internal storage device or an attached or network accessible storage. Computer programs 1406 in storage 1416 may be loaded into the memory elements 1404 and executed by a processor 1402 in a manner known in the art.

The system architecture 1400 may include fewer components than illustrated, additional components not illustrated herein, or some combination of the components illustrated and additional components. The system architecture 1400 may comprise any computing device known in the art, such as a mainframe, server, personal computer, workstation, laptop, handheld computer, telephony device, network appliance, virtualization device, storage controller, etc.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the embodiments, the embodiments reside in the claims hereinafter appended or any subsequently-filed claims, and their equivalents.

What is claimed is:

1. A computer-implemented method, comprising:
receiving a data flow diagram including one or more operators, wherein each operator includes at least one of an incoming arc and an outgoing arc; and
for each operator,
for each incoming arc,
receiving an arc input actual schema that includes a first portion that is to be operated on by the operator and a second portion that is preserved context that is not to be operated on by the operator and that includes a context pointer that points to a context node in the first portion; and
validating that an arc input formal schema is compatible with a schema rooted in the context node in the first portion in the arc input actual schema by determining whether names of nodes in the arc input formal schema and the schema rooted in the context node match, wherein the validating uses a set of formal-to-actual bindings to match the nodes of the arc input formal schema and the schema rooted in the context node in the arc input actual schema; and
for each outgoing arc,
computing an arc output formal schema based on operator logic and operator inputs; and
computing an arc output actual schema with the first portion and the second portion that is preserved context from the arc input actual schema by replacing the context node in the first portion of the arc input actual schema with the arc output formal schema.

2. The method of claim 1, wherein the validation matches the names of the nodes of the arc input formal schema and the schema rooted in the context node in the arc input actual schema.

3. The method of claim 1, wherein the data flow diagram is compiled to generate executable code.

4. The method of claim 1, wherein the computation of the output actual schema uses a polymorphic copy.

5. A computer program product comprising a computer-readable storage medium including a computer readable program, wherein the computer-readable medium is a member of the set of computer readable media consisting of a semiconductor or solid state memory, a magnetic tape, a removable computer diskette, a rigid magnetic disk, an optical disk, a magnetic storage medium, and volatile and non-volatile memory devices, wherein the computer readable program when executed by a processor on a computer causes the computer to:
receive a data flow diagram including one or more operators, wherein each operator includes at least one of an incoming arc and an outgoing arc; and
for each operator,
for each incoming arc,
receiving an arc input actual schema that includes a first portion that is to be operated on by the operator and a second portion that is preserved context that is not to be operated on by the operator and that includes a context pointer that points to a context node in the first portion; and
validate that an arc input formal schema is compatible with a schema rooted in the context node in the first portion in the arc input actual schema by determining whether names of nodes in the arc input formal schema and the schema rooted in the context node match, and wherein the validating uses a set of formal-to-actual bindings to match the nodes of the arc input formal schema and the schema rooted in the context node in the arc input actual schema; and
for each outgoing arc,
compute an arc output formal schema based on operator logic and operator inputs; and
compute an arc output actual schema with the first portion and the second portion that is preserved context from the arc input actual schema by replacing the context node in the first portion of the arc input actual schema with the arc output formal schema.

6. The computer program product of claim 5, wherein the validation matches the names of the nodes of the arc input formal schema and the schema rooted in the context node in the arc input actual schema.

7. The computer program product of claim 5, wherein the data flow diagram is compiled to generate executable code.

8. The computer program product of claim 5, wherein the computation of the output actual schema uses a polymorphic copy.

9. A system, comprising:
a processor; and
hardware logic capable of performing operations, the operations comprising:
receiving a data flow diagram including one or more operators, wherein each operator includes at least one of an incoming arc and an outgoing arc; and
for each operator,
for each incoming arc,
receiving an arc input actual schema that includes a first portion that is to be operated on by the operator and a second portion that is preserved context that is not to be operated on by the operator and that includes a context pointer that points to a context node in the first portion; and
validating that an arc input formal schema is compatible with a schema rooted in the context node in the first portion in the arc input actual schema by determining whether names of nodes in the arc input formal schema and the schema rooted in the context node match wherein the validating uses a set of formal-to-actual bindings to match the nodes of the arc input formal schema and the schema rooted in the context node in the arc input actual schema; and
for each outgoing arc,
computing an arc output formal schema based on operator logic and operator inputs; and
computing an arc output actual schema with the first portion and the second portion that is preserved context from the arc input actual schema by replacing the context node in the first portion of the arc input actual schema with the arc output formal schema.

10. The system of claim 9, wherein the validation matches the names of the nodes of the arc input formal schema and the schema rooted in the context node in the arc input actual schema.

11. The system of claim 9, wherein the data flow diagram is compiled to generate executable code.

12. The system of claim 9, wherein the computation of the output actual schema uses a polymorphic copy.

* * * * *